United States Patent
Marze

(10) Patent No.: US 7,496,433 B1
(45) Date of Patent: Feb. 24, 2009

(54) METHOD AND APPARATUS FOR MINIMIZING THE NOISE EMITTED BY A ROTORCRAFT DURING TAKE-OFF AND LANDING

(75) Inventor: Henri-James Marze, Rognac (FR)

(73) Assignee: Eurocopter, Marignane, Cedex (FR)

( * ) Notice: Subject to any disclaimer, the term of this patent is extended or adjusted under 35 U.S.C. 154(b) by 736 days.

(21) Appl. No.: 11/092,821

(22) Filed: Mar. 30, 2005

(30) Foreign Application Priority Data

Mar. 30, 2004 (FR) .................................. 04 03298

(51) Int. Cl.
- *G05D 1/00* (2006.01)
- *G05D 1/06* (2006.01)
- *G06F 19/00* (2006.01)
- *B64C 27/00* (2006.01)

(52) U.S. Cl. ...................... 701/5; 701/2; 701/4; 701/7; 701/8; 701/15; 701/16; 701/18; 244/17.27; 244/1 N; 244/54

(58) Field of Classification Search .............. 244/17.27, 244/1 N, 54; 188/378; 248/550, 638; 181/207, 181/208, 209; 267/136; 701/1–18

See application file for complete search history.

(56) References Cited

FOREIGN PATENT DOCUMENTS

EP 0 945 841 9/1999

OTHER PUBLICATIONS

Patent Abstracts of Japan vol. 1998, No. 01, Jan. 30, 1998 & JP 09 254897 A Sep. 30, 1997, abrege; figures & JP 02 736045 B2 Apr. 2, 1998.
Patent Abstracts of Japan vol. 018, No. 569 (M-1695), Oct. 31, 1994 & JP 06 206594 A (Mitsubishi Heavy Ind Ltd), Jul. 26, 1994 abrege; figures.

*Primary Examiner*—Khoi Tran
*Assistant Examiner*—Bhavesh Amin
(74) *Attorney, Agent, or Firm*—Young & Thompson

(57) ABSTRACT

The method includes a preliminary period in which a reference rotorcraft is used that corresponds to a rotorcraft of a particular type, with a series of noise measurements being performed on said rotorcraft (1) in flight using noise sensors (C) disposed on said reference rotorcraft, and with operating domains being determined for the reference rotorcraft in which noise is less than a maximum noise level. Thereafter, the operating point without wind and operating domains with wind are subsequently determined for a rotorcraft of the particular type on the basis of operating domains for the reference rotorcraft.

28 Claims, 7 Drawing Sheets

Fig.4
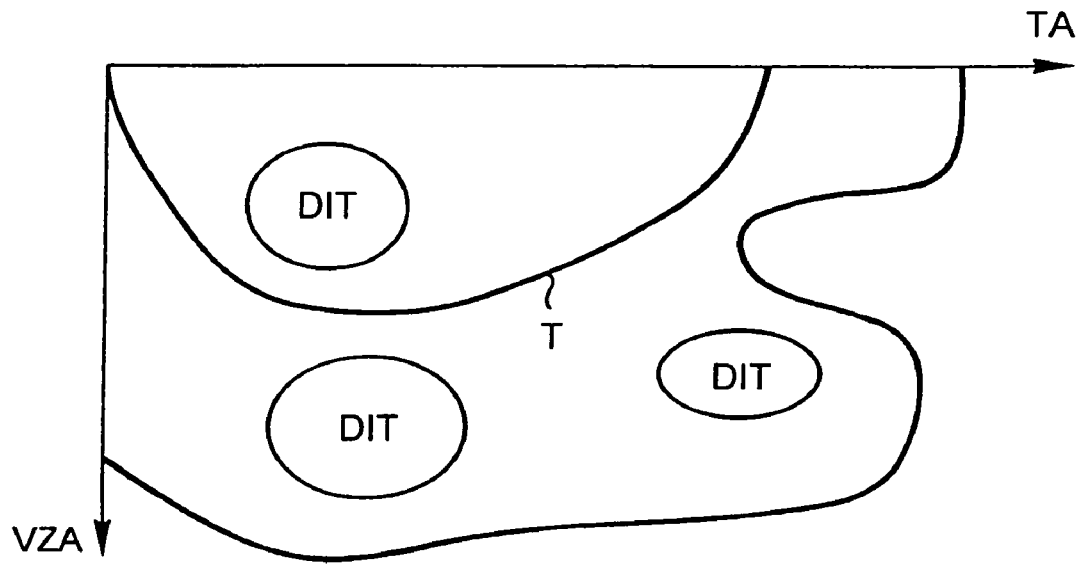
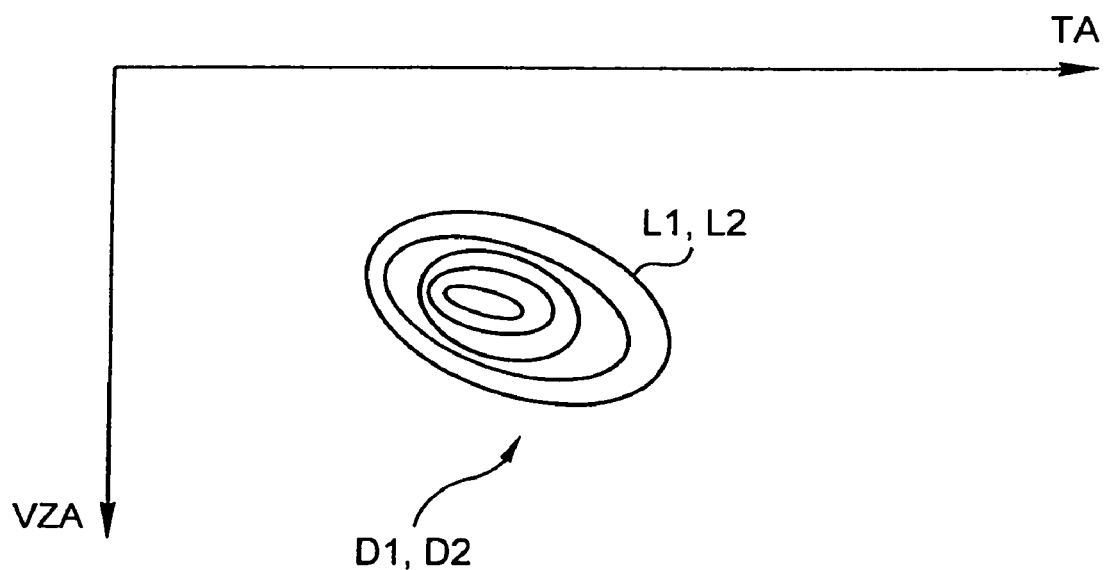
Fig.6

Fig. 7D
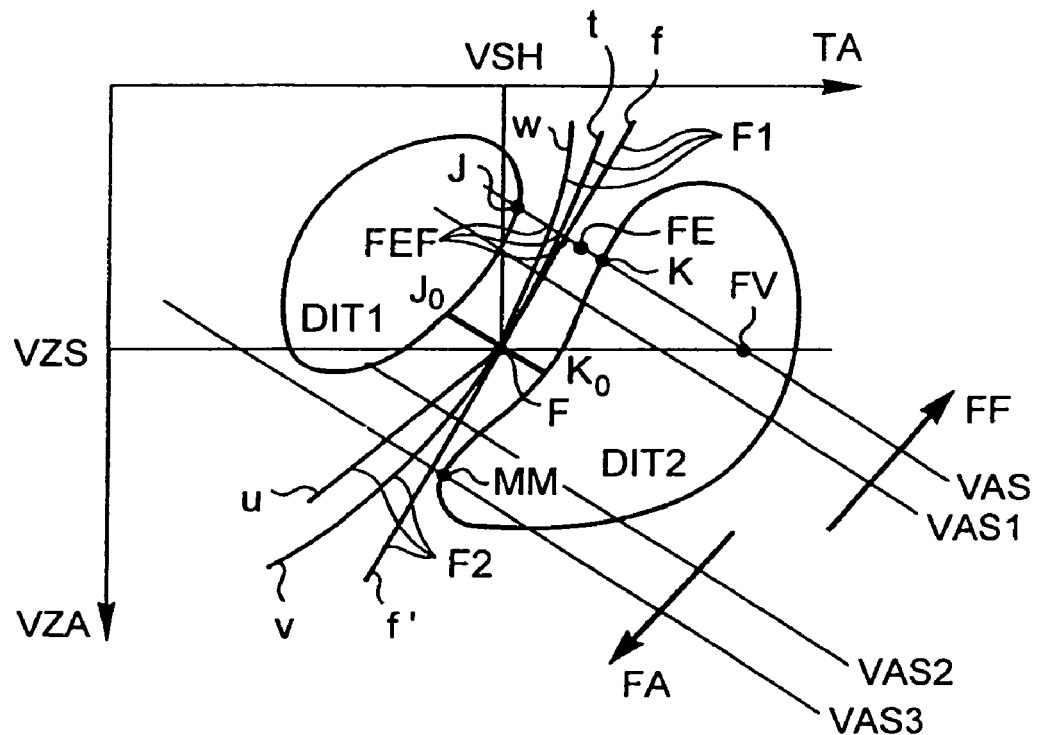
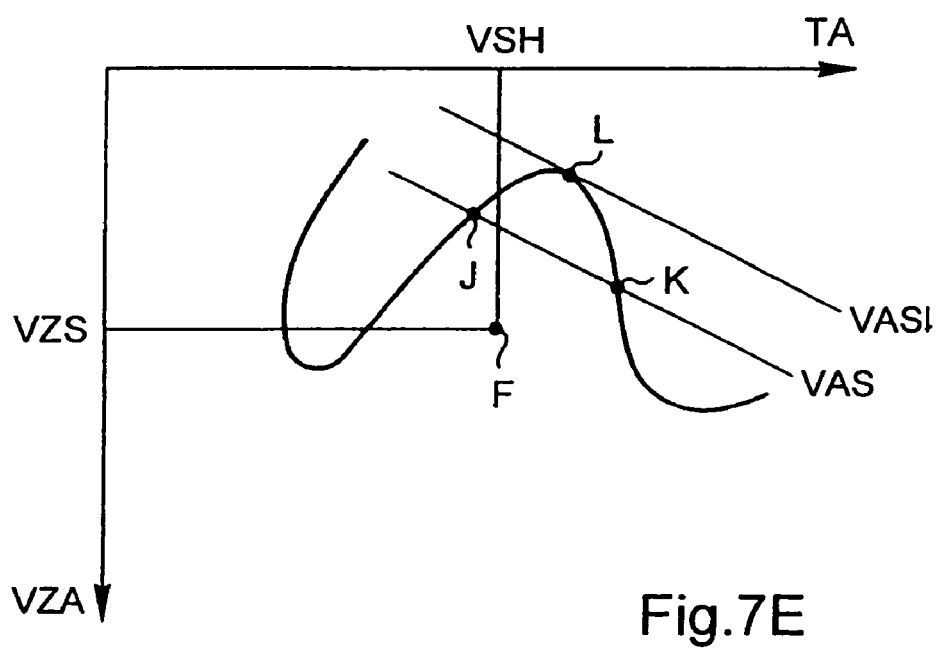
Fig. 7E

METHOD AND APPARATUS FOR MINIMIZING THE NOISE EMITTED BY A ROTORCRAFT DURING TAKE-OFF AND LANDING

The present invention relates to a method and to apparatus for minimizing the noise emitted during take-off and landing by a rotorcraft, in particular by a helicopter.

More particularly, the invention relates to reducing the noise nuisance produced by a rotorcraft close to a heliport or a helipad so as to minimize the number of people subjected to such excess noise by implementing a least-noise procedure.

In general, the noise emitted by a rotorcraft comprises in particular:
- the noise specific to the rotors operating (in the absence of excess noise);
- the compressibility noise of the advancing blades of the main rotor (Mach effect);
- the blade vortex interaction noise BVI;
- the blade wake interaction noise BWI;
- the noise of the tail rotor; and
- the noise of interaction between the main rotor and the tail rotor.

In certain stages of flight, rotorcraft generate high levels of noise, whereas the disturbance is minimized during other stages.

In the context of the present invention, a least-noise procedure comprises a combination of a geometrical flight path for reaching or leaving a helipad together with control parameters, in particular two components of aerodynamic air-speed which determine the amount of noise generated by the rotorcraft, in particular air-speed along its flight path and vertical air-speed, with this combination being designed to reduce the area of and to adapt the shape of an acceptable "equal-disturbance" noise footprint on the ground around a site.

The idea is not only to reduce noise emission, but also to minimize additional disturbance, as introduced by the duration of the noise, which depends directly on the speed of the rotorcraft.

In practice, disturbance on the ground can be reduced either by increasing the distance between a rotorcraft and an observer, or by reducing the amount of disturbance generated at source, or finally by requiring the rotorcraft to travel as quickly as possible. A least-noise procedure combines these three parameters to achieve best results.

In conventional manner, landing and taking off with minimum disturbance on the ground thus consists firstly in traveling using the least-noise flying conditions and secondly in permanently maintaining the greatest possible distance between the ground and the rotorcraft, in particular by conserving an angle of descent or climb that is as steep as possible. When the distance between the helicopter and the ground becomes too small to solve the problem by reducing disturbance generation at source, it is then necessary to increase the lateral distance between the observer and the rotorcraft: it is this lateral distance which defines the shape of the "equal-disturbance" footprint.

Nevertheless, the amplitudes and the intensities of these excess noise domains and minimum noise domains are functions of flying conditions that are specific to each site (altitude, pressure, temperature) and also to flying conditions specific to each flight, in particular the real mass of the helicopter.

It results from the above considerations that it would be appropriate to establish an optimum least-noise procedure for each flight, which is not realistic in practice.

There is a requirement for a procedure that is, if possible, unique so as to achieve a compromise between various flying conditions.

Furthermore, real sites are subjected to winds that vary, e.g. with season or indeed with height above the ground, such that the pilot cannot comply with control parameters (in particular flight path air-speed and vertical air-speed) as determined for without wind when attempting to follow a desired flight path over the ground. Without help, the pilot runs the risk of taking the rotorcraft into an excess noise zone.

In an attempt to provide a solution to this problem, documents JP 2 736 045 and EP 0 945 841 disclose respective apparatuses for remedying the above-mentioned drawbacks, at least in part. The procedure disclosed in document JP 2 736 045 describes apparatus enabling a least-noise landing path to be followed manually or automatically by using a pre-established database of sound footprints. That apparatus presents the drawback of not being capable of taking account of actual flying conditions (wind, aircraft weight, external configuration, . . . ).

To remedy that difficulty, document EP 0 945 841 proposes apparatus of the same type but operating in a "closed loop", based on making noise measurements on the ground and transmitting them in real time to the helicopter so as to select the optimum flight path on a continuous basis. Nevertheless, such apparatus presents the drawback of requiring microphones to be installed on the ground in the vicinity of the landing zone (generally several kilometers long), in association with a system for processing and transmitting sound measurements to the rotorcraft.

In addition, experience of sound measurement campaigns shows that the corrections provided by the real-time measurements recommended in document EP 0 945 841 run the risk of being unusable because of the very great fluctuations that can occur in the measurements, particularly in the presence of a wind that is strong and gusty. Since the propagation speed of noise is of the same order of magnitude as the propagation speed of disturbances due to the wind, a large amount of delay is introduced in the corrective actions, thereby leading to departures from the optimum flight path, or even to noise being amplified in comparison with a flight path that is not corrected at all.

A measurement campaign on a "Dauphin" helicopter has shown that the corridors corresponding to the looked-for noise criterion, i.e. noise less than the noise due to minimum-noise level overflight, for example, are very narrow and that any departure from such corridors quickly leads to the criterion being exceeded. The procedure therefore needs to be very accurate and cannot accommodate corrections which can only be relatively coarse, for the physical reasons mentioned above.

An object of the present invention is to remedy those drawbacks by proposing a take-off and landing procedure for a rotorcraft that satisfies the following criteria simultaneously:

a) for a rotorcraft of a particular type, the flight path-relative to the ground must remain substantially identical, which means that the slope of said flight path must be maintained substantially constant regardless of atmospheric conditions (wind in particular) and regardless of the configuration of the rotorcraft (mass in particular);

b) all along this flight path, two parameters (e.g. flight path air-speed along the flight path and vertical air-speed) must be controlled as a function of mean wind and mean ascending current at the height of flight, given that such control can be considered as being controlling air gradient); and c) the level of noise disturbance all along the flight path must be uniform, e.g. with the purpose of matching the disturbance produced by least-noise level overflight, with this stage of flight corresponding to the beginning of least-noise landing and also to the end of least-noise take-off.

It should be observed that reference to the disturbance produced by level overflight serves to define a minimum altitude for overflying zones that are sensitive to noise in compliance with the noise level that is acceptable for the environment. Nevertheless, any other criterion for defining the acceptable flying domain could be used, e.g. a stabilized rate of climb.

According to the invention, the method of minimizing the noise emitted during take-off and landing by a reference rotorcraft corresponding to a rotorcraft of a particular type is remarkable in that:

a) a series of measurements are taken on the reference rotorcraft during preliminary flights, in which the values of a plurality of noise levels are measured as detected by a plurality p of sensors secured to the reference rotorcraft and representative of noise emission for n configurations of the reference rotorcraft, where n is the product of:

m masses of the reference rotorcraft;
q speeds of rotation of the main rotor; and
r speeds of rotation of the tail rotor;

b) from this series of measurements, a first series of n×p diagrams is established representing a series of equal noise levels in a (flight path air-speed, vertical air-speed) system of coordinates;

c) said first series of diagrams is transformed into a second series of n×p diagrams representing a series of equal noise levels in the (flight path air-speed, vertical air-speed) system of coordinates by:

firstly correcting the noise representative of noise nuisance that depends on the duration of noise application; and secondly a correction for correcting each mass into an apparent weight of the reference rotorcraft as a result of atmospheric conditions at the flying altitude;

d) in each diagram of the second series of diagrams, the equal noise level curve is selected that corresponds to the maximum acceptable noise;

e) for each apparent weight, the envelope is established of the curves that correspond to an acceptable maximum noise level in the (flight path air-speed, vertical air-speed) system of coordinates, thereby determining m flight domains in which noise is less than said maximum acceptable noise; and f) in each flight domain, an operating domain is selected determining a set of m operating domains for the reference rotorcraft.

It should be understood that the term "equal noise level curve" is used in paragraph d) above may indicate either a single continuous curve, or a plurality of curved segments.

Furthermore, examining the operating domains for mass configurations that have been tested in flight shows that it is possible to define least-noise landing and take-off procedures for a rotorcraft that are common to all of the mass configurations of that rotorcraft.

Thereafter, advantageously, during take-off and landing procedures for a rotorcraft of the particular type of rotorcraft:

a) the instantaneous equivalent mass of the rotorcraft is calculated; and b) the operating point without wind and the instantaneous operating domain with wind for the rotorcraft having said instantaneous apparent weight are determined from the set of m operating domains for said reference rotorcraft.

Thus, by means of the invention, a flight path is generated that is optimum in terms of noise on the basis of reference noise measurements performed once only on said reference rotorcraft and solely on the basis of noise levels measured using sensors disposed on said reference rotorcraft.

Advantageously, said sensors are microphones preferably disposed on the fuselage of said rotorcraft, on the outside or on the rotary elements (or close thereto) such as the main rotor and the tail rotor.

It is also possible to install the noise sensors inside the fuselage, even though the noise that is received therein is less representative of outside noise.

It should be observed that measured ground footprints have made it possible to verify that each landing and take-off procedure generated in accordance with the invention from measurements taken by on-board sensors does indeed corresponding to a least-noise procedure. For this purpose, correlations have been made with measurements on the ground at a plurality of significant points along the least-noise flight path.

This similarity makes it possible to generate a least-noise procedure while avoiding an array of microphones on the ground, which would be fragile, expensive, and difficult to operate.

Furthermore, making use of measurements taken by on-board sensors has been found to be more accurate, since the information is available within a few seconds of stabilized flight, whereas when using sensors on the ground, measurements remain unstable because of continuous fluctuations in the flight path and the atmosphere between the aircraft and the ground.

Consequently, in the invention, a noise database is established which is subsequently used is a manual or an automatic process for following a flight path, with this being possible in complete safety with present-day aviation equipment, such as vertical air-speed indicators and air-speed and pressure installations, or indeed with equipment of the kind disclosed in documents FR 2 801 966 and FR 2 801 967.

The present invention also provides apparatus for controlling a rotorcraft of a particular type of rotorcraft in application of least-noise take-off and landing procedures.

According to the invention, said apparatus is remarkable in that it comprises:

a computer having a memory containing the pre-established operating domains of said rotorcraft, said computer being suitable for automatically determining the operating point without wind and the operating domain with wind corresponding to the instantaneous equivalent mass of said rotorcraft;

a vertical air-speed indicator and air-speed and pressure gauge equipment for acquiring values for the flight path air-speed and for the vertical air-speed of said rotorcraft;

a receiver for determining the ground speed and the position in three dimensions of said rotorcraft;

means for displaying control set-points as generated by said computer; and at least one fuel gauge per fuel tank for determining the instantaneous mass of said rotorcraft.

The receiver for determining the ground speed and the position in three dimensions of the rotorcraft may be a GPS receiver or any other equivalent device.

Furthermore, said apparatus may further include an automatic pilot for acting directly on the controls of said rotorcraft in order to generate the take-off and landing procedure for said rotorcraft automatically.

Thus, by means of the invention, the descent flight path is stabilized, for example it is a straight line to facilitate the task of the pilot both in a semiautomatic procedure (with the pilot following set-points displayed by the computer) and in an automatic procedure (controlled entirely by the autopilot), since under all circumstances the pilot must be capable of taking control in the event of the autopilot or the computer failing. To make this possible, the pilot must be in a position to assess quickly the appropriateness of the set-points displayed, and that is possible only for a flight path that is simple.

Advantageously, the apparatus of the invention also makes it possible to maintain maximum climb performance or maximum accelerated or decelerated level overflight performance while minimizing the noise emitted by a rotorcraft of the particular type of rotorcraft.

In addition, in the invention, the least-noise procedure makes it possible to ignore the disturbances due to average winds whether vertical or horizontal, that vary as a function of time and of altitude, with the air parameters of said rotorcraft being corrected on a continuous basis.

Naturally, the invention applies to any type of rotorcraft, including particular aircraft such as combined fixed-wing and rotary-wing aircraft or indeed convertible aircraft. Furthermore, such a rotorcraft can be provided with a single main rotor or with two rotors in tandem, for example. Similarly, the tail rotor may be ducted or otherwise, for example.

The figures of the accompanying drawings show clearly how the invention can be implemented. In the figures, identical references designate elements that are similar.

FIG. 4 shows an example of a least-noise flight path from level flight down to landing.

FIG. 6 is an example of a diagram of equal noise levels established on the basis of measurements performed using microphones.

FIG. 7D shows the positions of effective operating points FEF in the presence of a head wind FF or a tail wind FA.

FIG. 7E shows a special case in which the effective operating points can constitute a limit wind point.

Figure 1:
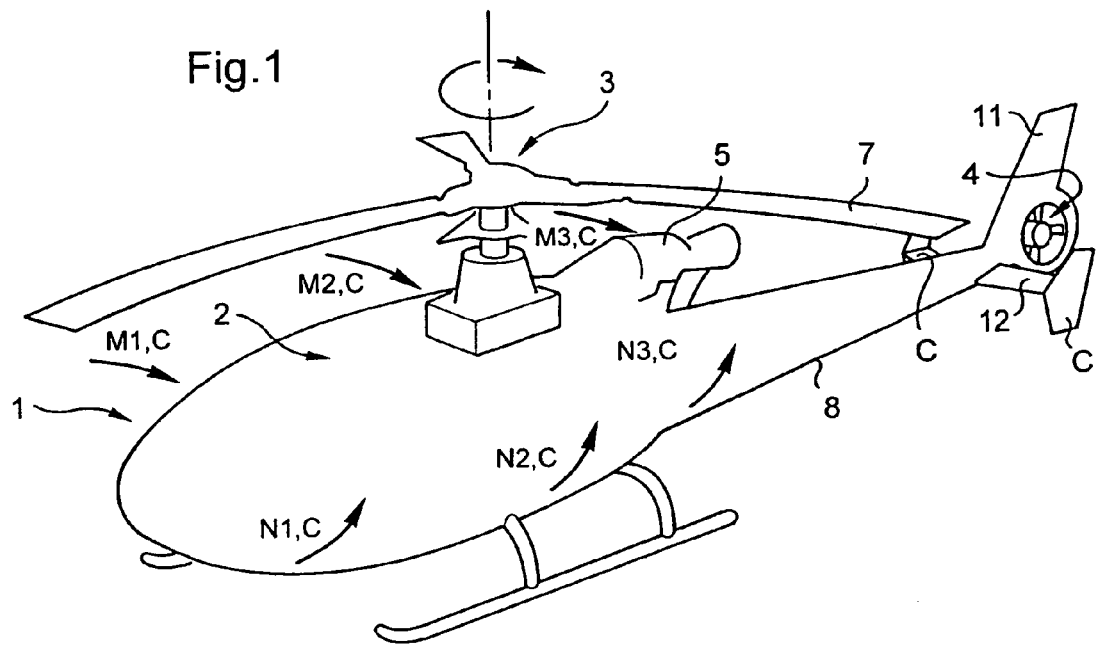
FIG. 1 is a diagram of a rotorcraft to which the present invention is applied.

The particular type of rotorcraft 1 shown in FIG. 1 to which the present invention is applied comprises in conventional manner a fuselage 2, an engine unit 5 suitable for rotating a main advance and lifting rotor 3 made up of blades 7, and an anti-torque tail rotor 4. The fuselage is extended rearwards by a tail boom 8 with the tail rotor 4 being disposed at its free end, together with a vertical tail fin 11 and a horizontal tail plane 12.

Figure 2:
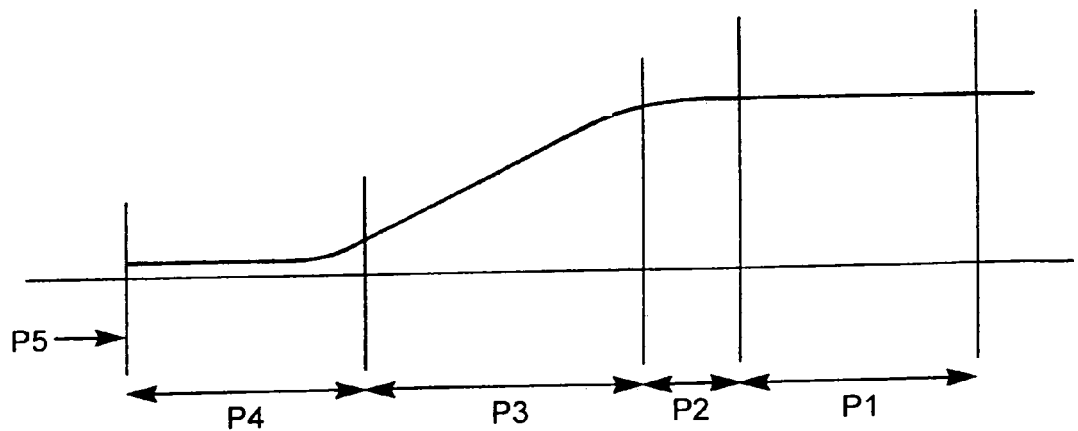
FIG. 2 is a diagram showing the flight path followed by a rotorcraft, in particular during a landing stage.

In FIG. 2, there is shown the simplest flight path that a rotorcraft can follow, for example when landing. To reach a landing zone, this flight path needs to comprise four stages:

an initial horizontal flight stage P1 during which the speed of the rotorcraft decreases, i.e. constituting a stage of decelerating overflight (on take-off this would be a stage of accelerating overflight);

a transition curve P2 between the level flight and the following stabilized descent, corresponding to an increase in vertical air-speed VZA, air-speed TA along the flight path being kept constant;

a stabilized descent stage along a straight line P3 that is connects substantially tangentially to the curve P2 and to a curve P4 defined below; and a transition curve P4 from stabilized descent to a landing decision point P5.

Figure 3A:
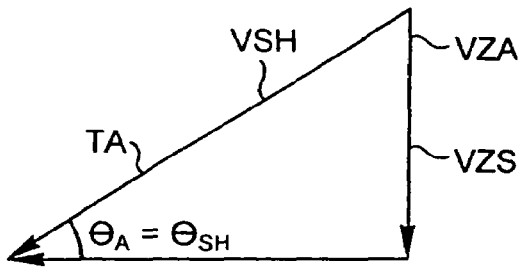
FIG. 3A is a velocity vector diagram for a rotorcraft during landing on a flight path of constant slope.

The term "flight path air-speed TA" and "vertical air-speed VZA" are known to the person skilled in the art and correspond to definitions as shown in FIG. 3A, provided by way of example.

FIG. 3A is a vector diagram for the rotorcraft traveling in its stabilized descent stage and a ground speed VSH relative to the ground, equal by definition to the flight path air-speed in the absence of wind and following a flight path of slope $\theta_{SH}$ relative to the ground. Under such circumstances, it turns out that the definitions of flight path air-speed TA and vertical air-speed VZA correspond to the following remarks:

the flight path speed TA is equal to the speed VSH of the rotorcraft relative to the ground;

the slope $\theta_A$ of the flight path air-speed TA relative to the ground is equal to the slope $\theta_{SH}$ of the flight; and the vertical air-speed VZA is equal to the vertical component of the flight path air-speed TA and to the vertical component VZS of the speed VSH of the rotorcraft relative to the ground.

Figure 3B:
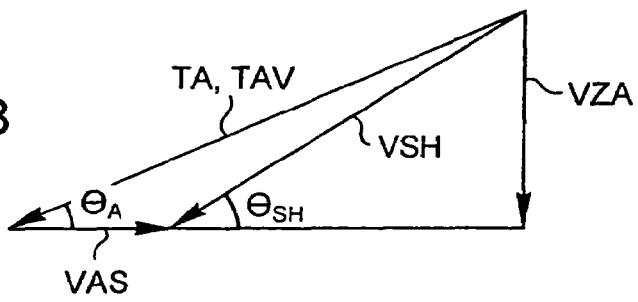
FIG. 3B shows the effects of a head wind on a rotorcraft while landing.

For example, in the presence of a head wind of speed VAS (for air-speed relative to the ground), the flight path air-speed TA is given by $\overline{TA}+\overline{VAS}=\overline{VSH}$, as shown in FIG. 3B. The vertical speed of the rotorcraft VZS relative to the ground is then equal to the vertical air-speed VZA.

Figure 3C:
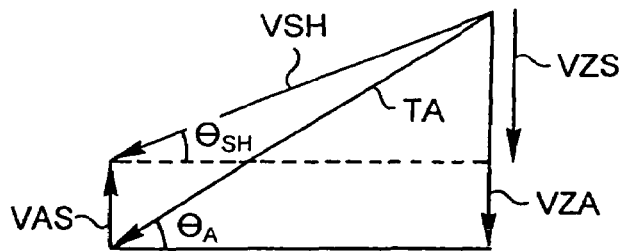
FIG. 3C is a velocity vector diagram for a rotorcraft while landing in the presence of a rising wind.

Still by way of example, FIG. 3C shows the effects of a rising wind of speed VAS. Under such conditions, it can be seen that the vertical air-speed VZA is equal to the sum of the amplitudes of the rising wind speed VAS and the vertical speed VZS of the rotorcraft relative to the ground.

Figure 3D:
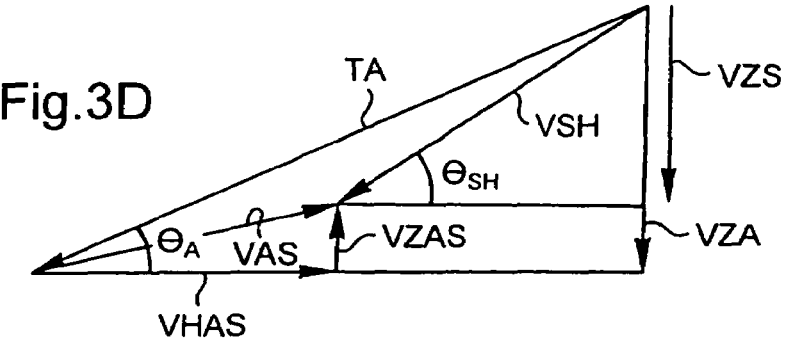
FIG. 3D is a velocity vector diagram for a rotorcraft while landing in the presence of an arbitrary wind.

From FIGS. 3B and 3C, it is possible to establish FIG. 3D relating to the combined effects of a (horizontal) head wind and a vertical wind representing the two components of an overall wind of the VAS. FIG. 3D does not require any particular comments.

It should be observed that in the invention said stabilized descent stage is a straight line portion of constant slope relative to the ground. As a result, the pilot retains the same assessments and the same reflexes during this stage of flight. To follow this straight line, the pilot must consequently continuously adjust the flight path air-speed TA and the vertical air-speed VZA in order to compensate for disturbances introduced by the wind. Naturally, when there is no wind, the flight path air-speed TA and the vertical air-speed VZA remain constant, but this is hardly ever the case.

With reference to the flight path shown in FIG. 2, as described above, a landing (or take-off) procedure for the rotorcraft causes each point along the flight path to correspond with a pair of values (TA-VZA), i.e. a point on a particular curve in a map drawn in a system of coordinates (TA, VZA).

In order to comply with minimal noise characteristics, it is necessary in the map for the curve joining all (TA-VZA) pairs to correspond to the procedure being followed that passes through points for which noise level remains less than a maximum acceptable level.

A low noise procedure must therefore avoid unacceptable noise domains.

Any procedure that avoids the unacceptable domains thus complies with the initially defined least-noise criterion. FIG. 4 shows an example of a flight path T from level flight down to landing in a system of coordinates (TA, VZA), in which domains DIT are said to be "unacceptable" and correspond to domains where the noise level is above a maximum acceptable level.

Figure 5:
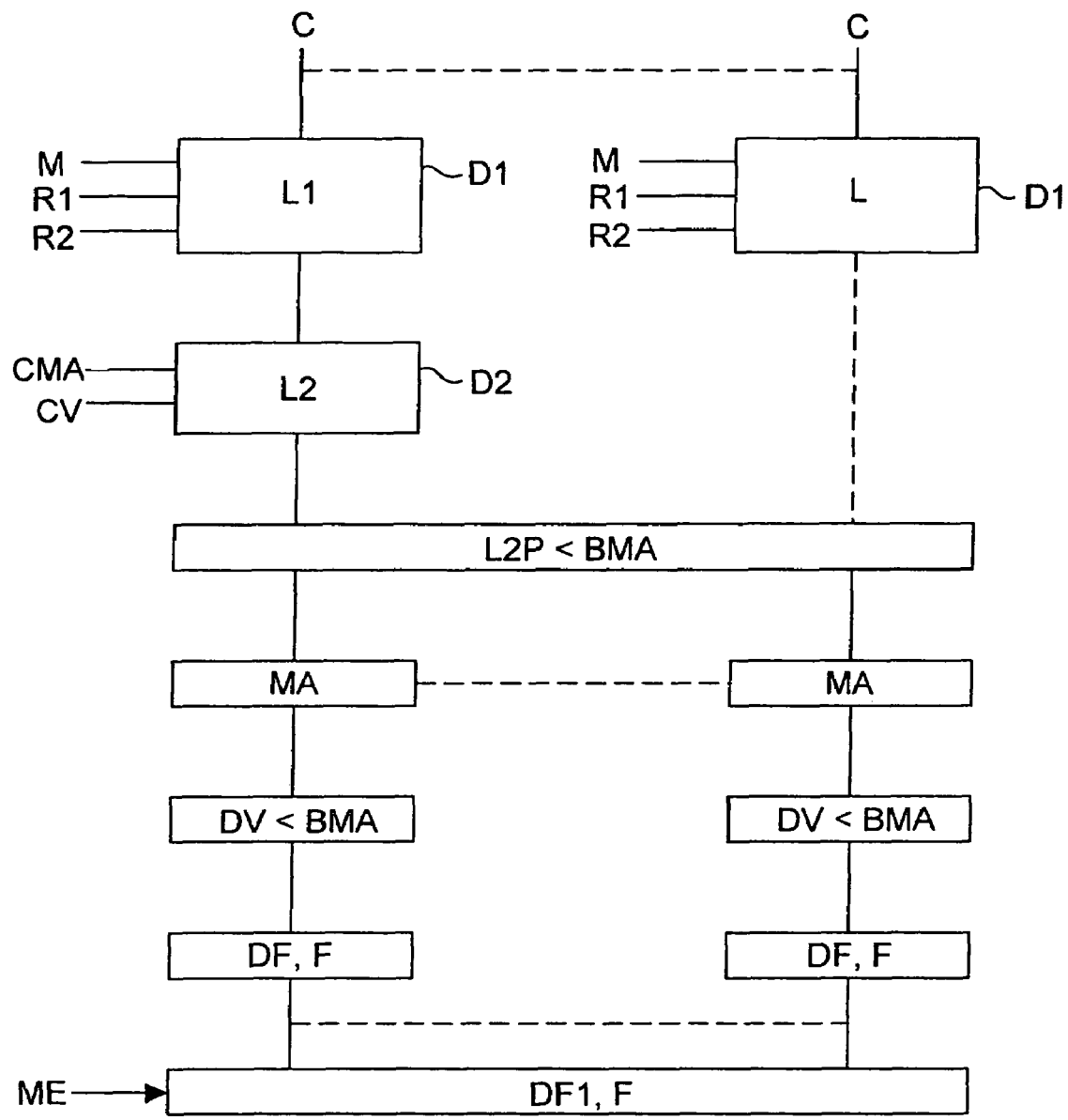
FIG. 5 is a block diagram summarizing the application of the method in accordance with the invention for minimizing the noise emitted during take-off and landing of a rotorcraft.

To do this, the method in accordance with the invention (of stages shown diagrammatically in FIG. 5) presents at least the following:

a preliminary step; and a subsequent step of making use of the results established during the preliminary step.

In the invention, during said preliminary step, in which a reference rotorcraft corresponding to a particular type of rotorcraft 1 under consideration (a "Dauphin", "Puma", . . . type helicopter) is used for establishing a least-noise take-off and landing procedure:

a) a series of measurements are taken from the reference rotorcraft, during preliminary flights, to obtain values for a plurality of sound levels detected by a plurality p of sensors C secured to the reference rotorcraft and representative of the noise emitted for n configurations of the reference rotorcraft, where n is the product of:

m masses M for said reference rotorcraft;

q speeds of rotation R1 for the main rotor 3; and r speeds of rotation R2 for the tail rotor 4;

b) from this series of measurements, a first series of n×p diagrams D1 is established representing a series of equal sound levels L1 in a system of coordinates (TA, VZA), where TA is the flight path air-speed and VZA is the vertical air-speed of said reference rotorcraft;

c) this first series of diagrams D1 is transformed into a second series of n×p diagrams D2 representing a series of equal noise levels L2 in the system of coordinates (TA, VZA) by performing the following:

firstly making a noise correction CV representative of noise nuisance which depends on the length of time the noise is applied; and secondly making a correction CMA for correcting each mass M into an apparent weight MA for the reference rotorcraft that results from atmospheric conditions at the altitude of flight;

d) in each diagram D2, the equal noise level curve L2P that corresponds to the maximum acceptable noise level BMA is selected;

e) for each apparent weight MA, the envelope is established of the curves L2P in the system of coordinates (TA, VZA), thereby determining m flight domains DV for which noise is less than said maximum acceptable noise level BMA; and f) in each flight domain DV, an operating domain DF is selected that determines a set m of operating domains for the reference rotorcraft.

The subsequent step of using the results established during the preliminary step relates to each rotorcraft 1 of the particular type of rotorcraft, in which:

a) the instantaneous equivalent mass ME of said rotorcraft 1 is calculated; and b) the wind-free operating point F and the instantaneous operating domain DF1 of said rotorcraft 1 for said instantaneous apparent weight ME are determined on the basis of the set of m operating domains of the reference rotorcraft.

In the preliminary step, a first series of diagrams is established of the same type as the diagram D1 shown diagrammatically in FIG. 6, these diagrams representing equal level curves L1 established in a system of coordinates (TA, VZA) on the basis of sound measurements relating to a sensor C, e.g. a microphone placed on the reference rotorcraft.

Naturally, the domain outside a closed equal level curve decreases as the noise level increases, for example.

In conventional manner, each noise level can be used in the following main modes:

either as a root mean square (rms) level;

or as a peak level;

or as a peak/rms level;

or as a weighted level.

To do this, the sensors C are advantageously located on the reference rotorcraft on the same side as the side on which the blades advance, in order to facilitate studying the compressibility excess noise and BVI. For studying BVI while turning (to left or to right), it is necessary to locate sensors C on both sides of the helicopter.

For this purpose, it is preferable to place said sensors C:

a) on the side of the fuselage 2 of the rotorcraft 1 that corresponds to the blades advancing:

in a first zone N1 at the front of the fuselage 2;

in a second zone N2 slightly ahead of said main rotor 3; and in a third zone N3 behind said main rotor 3;

b) at each of the ends of the horizontal tail plane 12.

It should be observed that placing sensors C at each of the ends of the horizontal tail plane 12 corresponds in principle to the solution retained for a helicopter fitted with an anti-torque tail rotor 4 of the ducted tail rotor type. When the anti-torque tail rotor 4 is not ducted, the sensors C are generally disposed in identical manner in the zones N1, N2, and N3, and also on a pole situated in the plane of the anti-torque rear rotor.

It should be observed that it is also possible for the installation further to include additional sensors disposed in zones M1, M2, and M3 that are respectively symmetrical to the zones N1, N2, and N3 about the longitudinal plane of symmetry of the reference rotorcraft.

Consequently, n×p diagrams D1 are obtained corresponding to:

p sensors;

n configurations of the reference rotorcraft comprising:

m masses M of said reference rotorcraft;

speeds of rotation R1 of the main rotor 3; and r speeds of rotation R2 of the tail rotor 4.

The numbers m, q, and r can be equal to unity, but each of them is preferably set at three.

Starting from the first series of diagrams D1, a second series of corrected diagrams D2 is established in which the equal-level curves L1 in each diagram D1 are deformed into equal-level curves L2 by applying a noise correction CV and an apparent weight correction CMA.

The noise correction CV takes account of the fact that when the rotorcraft is traveling at a slow speed, noise nuisance is of longer duration. In order to take physiological effects into account, as set down by standards, a noise penalty is introduced of the form $10 \log(V/TA)$ where V designates a reference speed of the rotorcraft. Advantageously, the reference speed V designates the least-noise horizontal overflight speed VS or any other flight condition selected as a reference, e.g. rising at the maximum rise speed VY.

The apparent weight correction CMA is introduced because of the influence of the mass of the rotorcraft on the level of the noise it emits, and consists in causing each diagram D1 to correspond to each apparent weight MA equal to $M/(\rho/\rho_0)$ where $\rho/\rho_0$ represents the mass per unit volume relative to the air at the altitude of flight, and not to each initial M.

In each corrected diagram D2, the equal noise level curve L2P is selected for which the noise level is equal to a maximum noise level BMA, thus defining an unacceptable internal domain that is to be excluded from the least-noise take-off and landing procedure.

Preferably, the maximum noise level BMA is set at the reference noise level corresponding to minimum noise level overflight.

By superposing the set of curves L2P for each apparent weight (p×q×r curves L2P for each apparent weight), an envelope is obtained of unacceptable domains DIT that are to be excluded because they present noise levels greater than the maximum noise level BMA. The remaining domain determines the authorized flight domain DV. As a result, n authorized flight domains DV are obtained, i.e. one flight domain for each apparent weight.

Advantageously, at the end of the preliminary step, an operating point F and an operating domain DF are determined for each apparent weight. The operating point F and the operating domain DF are naturally contained within each corresponding flight domain DV.

In practice, the operating point F is preferably determined in such a manner that:

it corresponds to conditions of a rotorcraft descending or climbing in low wind with a slope $\theta_{SH}$ that is substantially constant relative to the ground, during stage P3 or during a stabilized operating stage.

Given the explanations above relating to FIG. 3A, the operating point F corresponds to the following conditions:

the flight path air-speed TA is equal to the speed VSH of the rotorcraft relative to the ground; and the vertical air-speed VZA is equal to the vertical component VZS of the speed VSH of the rotorcraft relative to the ground.

Under these conditions, the slope of the rotorcraft flight path is indeed equal to $\theta_{SH}$. In order to ensure that this flight path slope $\theta_{SH}$ is maintained regardless of the apparent weight MA of the rotorcraft and in order to enable a single take-off and landing procedure to be applied, it is in fact appropriate for the operating point F to remain unchanged in each system of coordinates (TA, VZA) and to correspond to the coordinates TA=VSH and VZA=VZS.

the least-noise take-off and landing procedure can be applied in the presence of wind, by determining the corresponding operating domain DF. Any least-noise procedure must be applicable regardless of the wind (within a reasonable range of winds) so as to make it possible to land a rotorcraft at a precise point, for example.

In practice, the horizontal and vertical components of the wind disturb the flight path so that it is necessary to correct the flight path air-speed TA and the vertical speed VZA in order to ensure that the helicopter continues to follow the same slope relative to the ground and to ensure that the flight path does indeed remain a straight line in the zone P3. Since the disturbances introduced by the wind fluctuate over time and with altitude, it is necessary to correct the aerodynamic flight path of the rotorcraft (i.e. as determined by its air-speed components) on a continuous basis in order to compensate for the influence of wind.

Figure 7A:
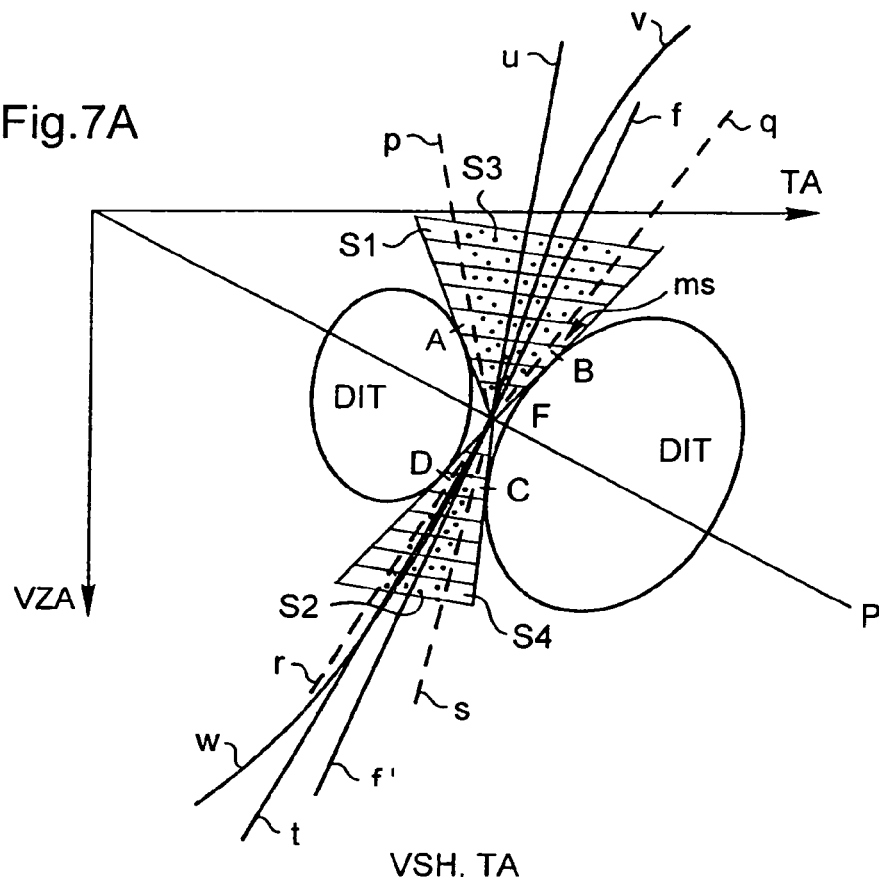
FIG. 7A shows an operating zone for a rotorcraft in a least-noise procedure, and the appearance of the associated control laws, passing via the without-wind operating point F.

It will readily be understood from FIG. 7A (drawn up for a predefined apparent weight), that the freedom to choose operating point pairs (TA-VZA) making it possible to compensate for medium changes in wind remains limited. The point pairs (TA-VZA) must remain contained within a relatively narrow operating domain DF if it is desired to comply with an acceptable slope $\theta_{SH}$ (a limit value being set at about 10° for passenger comfort) and in order to avoid excessive variations in control parameters.

In general, the operating domain DF is determined mainly by the following conditions:

the position F of the stabilized operating point without wind;

the outlines of the unacceptable domains DIT;

the margins of maneuverability in terms of flight path air-speed TA and vertical air-speed VZA in the vicinity of the unacceptable domains DIT in order to allow rotorcraft unbalance to be compensated and above all in order to compensate wind variations without penetrating into the unacceptable domains DIT; and the ability to comply with the noise criteria in force over the widest possible range of winds.

In practice, an operating domain DF is established, as shown in FIG. 7A, as follows:

in a first step, two angular sectors (S1, S2) are defined that are tangential to the unacceptable domains DIT at four points (A, B, C, D), the common vertex of these angular sectors being the operating point F when there is no wind: these two angular sectors (S1, S2) are represented in the form of shading in FIG. 7A;

in order to introduce safety margins (maneuverability, . . . ), the operating domain DF is defined in a second stage in the form of two angular sectors (S3, S4), where the angular sectors S3 and S4 (shown in FIG. 7A by a dotted zone) are included respectively within the sectors S1 and S2 and are defined respectively by straight lines (Fp, Fq) and (Fr, Fs) so that their distances from the tangential points A, B, C, and D are equal to the selected safety margin ms.

It can be seen that the angular sectors (S3 and S4) defining the operating domain DF for a predefined apparent weight MA of the rotorcraft are such that the operating domain relating to the angular sector S3 is not necessarily symmetrical relative to the operating domain relating to the angular sector S4.

Each operating domain DF as determined in this way can still be quite large. In order deliberately to simplify piloting and still allow the procedure to be complied with effectively, it is preferable to adopt a control law that is linear between the two air-speed components. In the selected configuration, these two components can be the flight path air-speed TA, the vertical air-speed VZA, and the slope $\theta_A$ relative to air. Deliberately selecting a linear control law is represented by a straight line (fFf') plotted in the above-defined domain DF in FIG. 7A, this straight line (fFf') passing through the wind-free operating point F.

Depending on the shape of the angular sectors S3 and S4, it can be advantageous to replace the straight line (fFf') by two straight half-lines Fu and Ft that are plotted respectively in each of the angular sectors S3 and S4 (control law uFt), or by a curve vFw that is particularly advantageous in terms of piloting, comfort, and safety.

Under such conditions, it is important to observe that:
each of the points, whether of the straight light (fFf), or of the two straight half-lines Ft and Fu, or of the curve vFw, corresponds to a particular wind speed value: consequently, an additional constraint is put on piloting the rotorcraft, i.e. complying with the instantaneous coordinates TA (flight path air-speed) or VZA (vertical air-speed) corresponding to the instantaneous operating point or the effective operating point FEF relating either to the straight line (fFf) or to the one of the straight half-lines Ft and Fu, or to the curve vFw, with this applying for the instantaneous value of the wind speed. It should be observed that this additional constraint can be a law between the two "air parameters" such as TA and VZA for example (in particular for a constant slope), or else a particular value that is set for one of the "air parameters", e.g. keeping the VZA constant;

the control laws fFf, uFt, and vFw plotted in FIG. 7A are determined for a particular apparent weight MA of the rotorcraft. Under such conditions, varying these control laws with apparent weight makes it possible to obtain conditions that are optimal in terms of acceptable noise level (less than the fixed threshold) relating to each apparent weight. However, and for simplification purposes, it is possible to envisage in the general case using only one control law with respect to wind either of the fff type, or of the uFt or of the vFw type, regardless of the apparent weight MA of the rotorcraft; and preferably, the situation in the sector S3 or S4 of the operating points when wind is present complies with the condition whereby the ground speed VSH of the rotorcraft decreases in the presence of a head wind so as to improve piloting safety.

As an illustration of the effect of wind, and with reference again to FIG. 3B and to the corresponding comments, an example is taken of a rotorcraft in the presence of a head wind.

Under such circumstances, the rotorcraft always follows a flight path of slope $\theta_{SH}$ relative to the ground, and travels at a speed VSH.

Figure 7B:
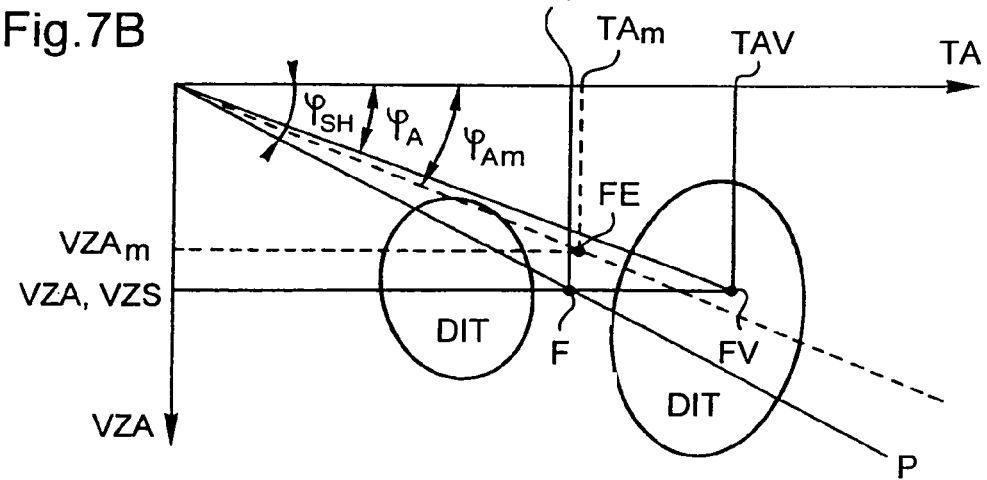
FIG. 7B shows ways of correcting the particular effect of a head wind in order to avoid unacceptable noise domains.

In the absence of wind, the flight path air-speed TA is equal to VSH and the stabilized operating point F in FIG. 7B is at the intersection between the abscissa straight line VSH and the line OP at an angle $\phi_{SH}$ such that $\tan \phi_{SH}$=VZA/TA.

In the presence of a head wind of speed VAS relative to the ground, the air-speed on the flight path TA is greater than the speed VSH, as shown in FIG. 3B and takes on a value TAV as shown in FIG. 7B.

Furthermore, the air slope $\theta_A$ is less than the value $\theta_{SH}$ as can be seen in FIG. 3B such that the operating point FV with wind (at the intersection of the ordinate straight line VZA equal to that of the point F and the straight line from the point O and of slope $\phi_A$ with $\tan \phi_A$=VZA/TAV can be located within the unacceptable domain DIT situated to the right of the point F in FIG. 7B.

Figure 7C:
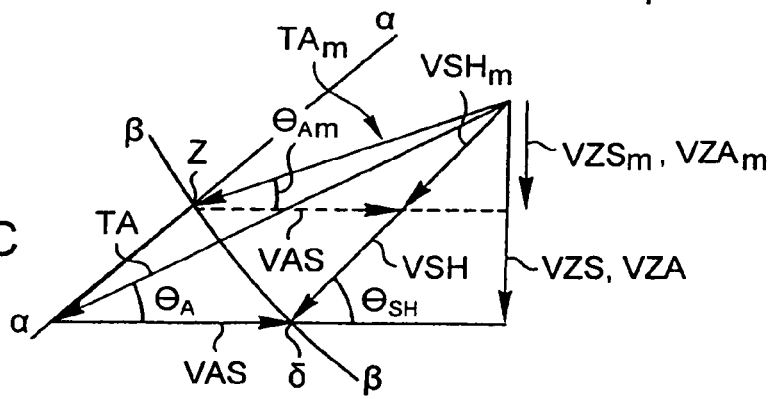
FIG. 7C is a velocity vector diagram associated with FIG. 7B.

In order to remedy this situation, and with reference to FIG. 7C, it is then appropriate to adjust, for example, the flight path air-speed to a value $TA_m$ which is different from TAV, thereby bringing the angle $\theta_A$ to a value $\theta_{Am}$, and the angle $\phi_A$ to a value $\phi_{Am}$ as shown in FIG. 7B. Correspondingly, the following can be observed:
the speed VSH takes on the value $VSH_m$;
the speed VZS takes on the value $VZS_m$; and
the speed VZA takes on the value $VZA_m$.
Under these conditions:

$\tan \phi A_m = VZA_m/TA_m$

Consequently, this process determines an effective operating point written FE in FIG. 7B that is situated outside the unacceptable domains DIT.

Under such conditions, and for each head wind speed value VAS, there are as many possible operating points FE as there are air-speed values on the selected flight path $TA_m$ or values for the angle $\theta_{Am}$. The set of these points FE for a head wind of speed VAS is represented by a curve whose equation takes on one of the following forms:

$$VZA_m^2 + \left(\frac{VZA_m}{\tan(\theta_{SH})} + VAS\right)^2 = TA_m^2$$

$TAm \times \cos(\theta_{Am}) - VAS = TA_m \times \sin(\theta_{Am})/\tan(\theta_{SH})$ FIG. 7D shows two portions of such a curve relating to two speeds VAS and VAS1 for a head wind, with the influence of an increasing head wind being represented by arrow FF.

In similar manner, the two curved portions identified by references VAS2 and VAS3 in FIG. 7D represent tail winds of speeds VAS2 and VAS3, with the tail wind speed increasing in the direction of arrow FA.

In general, each of these curves (VAS, VAS1, VAS2, VAS3, ... ) includes a portion that is situated in the authorized domain, i.e. between the unacceptable domains DIT1 and DIT2, for example as shown in FIG. 7D. Thus, curve segment JK relating to a head wind of speed VAS corresponds to the solutions that are possible for this wind. The points FE thus lie on the segment JK. Such a segment JK is substantially linear so long as the above-mentioned angles remain relatively small.

Nevertheless, it should be observed firstly that the segment JK could possibly be reduced to a single point L, in which case the point L represents the limit wind speed VASL that is acceptable, as shown in FIG. 7E, or indeed, secondly, the segment JK may be terminated at one end only, e.g. designated by the point MM in FIG. 7D for wind speed VAS3.

With reference to FIG. 7D and the explanations given above, it will be understood that for the wind speed VAS, for example, the effective operating point FEF belongs:
firstly to the segment JK; and
secondly to one of the angular sectors S3 or S4 as described above and more particularly complying with a control law in the presence of wind:
either of the type fFf: a single straight line passing through the operating point F without wind;
or of the type uFt: two straight half-lines coming from the point F;
or else of the type vFw: a continuous curve.

Under such circumstances, it results that for each wind speed VAS, there is only one effective operating point FEF. This point FEF is at the intersection between the segment JK and that one of the control laws with wind that is in use (fFf or uFt or vFw). FIG. 7D shows the positions of the point FEF for each of the control laws fFf, uFt, and vFw for the head wind VAS.

It is recalled that the operating point F without wind must be common, if possible, to all apparent weights MA of the rotorcraft so as to define a single "ground" procedure for climb or descent of the rotorcraft. However, the angular sectors S3 and S4 and also the control laws (fFf, uFt, or vFw) can vary as a function of variations in the apparent weight MA.

In general, the same process is applied for all combinations of wind (horizontal and/or vertical) so as to place the effective operating point FEF outside the unacceptable domains DIT.

Consequently, it will be understood that in order to remedy the various kinds of wind (head wind, tail wind, upwind, downwind), the effective operating point FEF is preferably moved depending on the control laws fFf' or uFt or vFw which are in general determined between limit points F1 and F2 (FIG. 7D).

With reference to FIG. 7D, for example, it will also be understood that the greatest robustness that can be obtained with the present invention corresponds to selecting firstly the operating point F without wind in the middle of the segment $J_O$, $K_O$ (relating to a wind of zero speed) and secondly to any effective operating point FEF with wind, situated in the middle of each segment JK, thus corresponding to a particular and optimized curve vFw that is equidistant from domains in which noise exceeds the maximum acceptable noise BMA, thus determining an optimum control law vFw in the presence of wind. Naturally, the curve vFw under such circumstances is not necessarily contained in the angular sectors (S3, S4). Advantageously, this curve vFw is independent of the apparent weight MA of a rotorcraft 1 of the particular type of rotorcraft.

During flight stages P2 and P4, as shown in FIG. 2, the operating point F without wind and the succession of effective operating points FEF with wind and the operating domains DF are likewise determined automatically from the preceding flight domains DV.

The subsequent step is performed during each landing and take-off procedure of a rotorcraft 1 of a particular type of rotorcraft.

To this end, the following operations are performed in succession:

a) the instantaneous equivalent mass ME of the rotorcraft 1 is calculated; and b) an instantaneous operating domain DF1 for the rotorcraft 1 is determined for said instantaneous apparent weight ME on the basis of the set of m operating domains of said reference rotorcraft.

The instantaneous equivalent mass ME is equal to the product of the instantaneous mass of the rotorcraft 1 (instantaneously adjusted because fuel is consumed as indicated by gauge 9) multiplied by the vertical acceleration $\gamma_Z$ to which it is subjected.

The domain DF1 can be applied by any numerical method, for example by interpolation from the preceding domains DF.

Naturally, the control law fFf', uFt, and vFw as described above are also applied to said rotorcraft 1 and are consequently integrated in each instantaneous operating diagram DF1 by the interpolations performed from the plot of these laws in the operating diagrams DF.

Advantageously, the control laws fFf', uFt, and vFw can be independent of the equivalent mass ME of the rotorcraft 1 of the particular type of rotorcraft.

Furthermore, and for generalization purposes, it is important to observe with reference to FIG. 3D relating to the influence of an arbitrary wind of speed VAS comprising a horizontal component VHAS and a vertical component VZAS, that the equilibrium of the rotorcraft is governed, regardless of its flight stage, by the following relationship $R_1$:

$$TA \times \sin(\theta_{SH} - \theta_A) = VZAS \times \cos(\theta_{SH}) - VHAS \times \sin(\theta_{SH})$$

which is obtained by projecting vectors onto an axis normal to the speed VSH of the rotorcraft relative to the ground.

Consequently, it can be seen that this equilibrium relationship, for a wind VAS having components VHAS and VZAS, relates the three characteristic parameters of the rotorcraft, i.e. its flight path air-speed TA and the angles $\theta_{SH}$ and $\theta_A$ relating respectively to the slope of the rotorcraft's flight path relative to the ground and to the slope of the flight path air-speed TA relative to the ground.

As set out above, the least-noise constraint leads to a relationship $R_2$ or control constraint relating two out of three of the "air parameters" TA, VZA, and $\theta_A$, e.g. in the form of one of the following equivalent forms:

$$TA = R_2(\theta_A)$$

$$TA = R_2(VZA)$$

$$VZA = R_2(\theta_A)$$

These are specifically the control laws fFf', uFt, and vFw. It will readily be understood by way of illustration that the lines fFf', uFt, and the curve vFw do indeed represent respective relationships between the parameters TA and VZA in the form $TA = R_2$ (VZA).

Obtaining a unique solution represented by an effective operating point FEF requires account to be taken of an additional relationship $R_3$ corresponding to an operating constraint.

In the particular circumstance of the landing stage P3, this relationship $R_3$ requires the slope $\theta_{SH}$ of the rotorcraft flight path to be kept constant insofar as it is required that the rotorcraft 1 lands at a precise point, as explained above.

In a variant relating in particular to a rotorcraft 1 taking off, the operating constraint may optionally correspond to selecting a function for maximum climb performance as a function of rotorcraft speed, such that the relationship $R_3$ takes the form:

$$VZA = R_3(TA)$$

This relationship is equivalent to a relationship $R_2$. However, there exists only one unique effective operating point FEF since the slope $\theta_{SH}$ of the rotorcraft flight path is then fully determined by the equations for flight mechanics.

In another variant relating in particular to a rotorcraft 1 overflying on the level while accelerating or decelerating, the operating constraint can be written in the form of a relationship $R_3$ such that the flight path speed TA is a function of time t, i.e., for example:

$$TA = R_3(t)$$

Under such circumstances, the relationship $R_3(t)$ is advantageously such that:

$$R_3(t) = a + \gamma_t$$

where a is a constant and $\gamma$ is the acceleration or the deceleration of the rotorcraft.

In which case, it should be observed that there is no longer only one effective operating point FEF since the slope $\theta_{SH}$ is zero by definition.

By way of illustration and with reference to FIG. 7C, it can be seen that for a wind of speed VAS, all of the unconstrained control solutions correspond to the straight line αα. The unique solution determining the sole effective operating point FEF in the presence of a wind of speed VAS is then the point Z where the straight line αα intersects a curve ββ passing through the point δ as defined in FIG. 7C. The point Z is the image in FIG. 7C of one of the effective operating points FEF in FIG. 7D.

Naturally, the method in accordance with the invention can be implemented on any type of rotorcraft, for example helicopters, combined fixed-wing and rotary-wing aircraft, and convertible aircraft.

Figure 8:
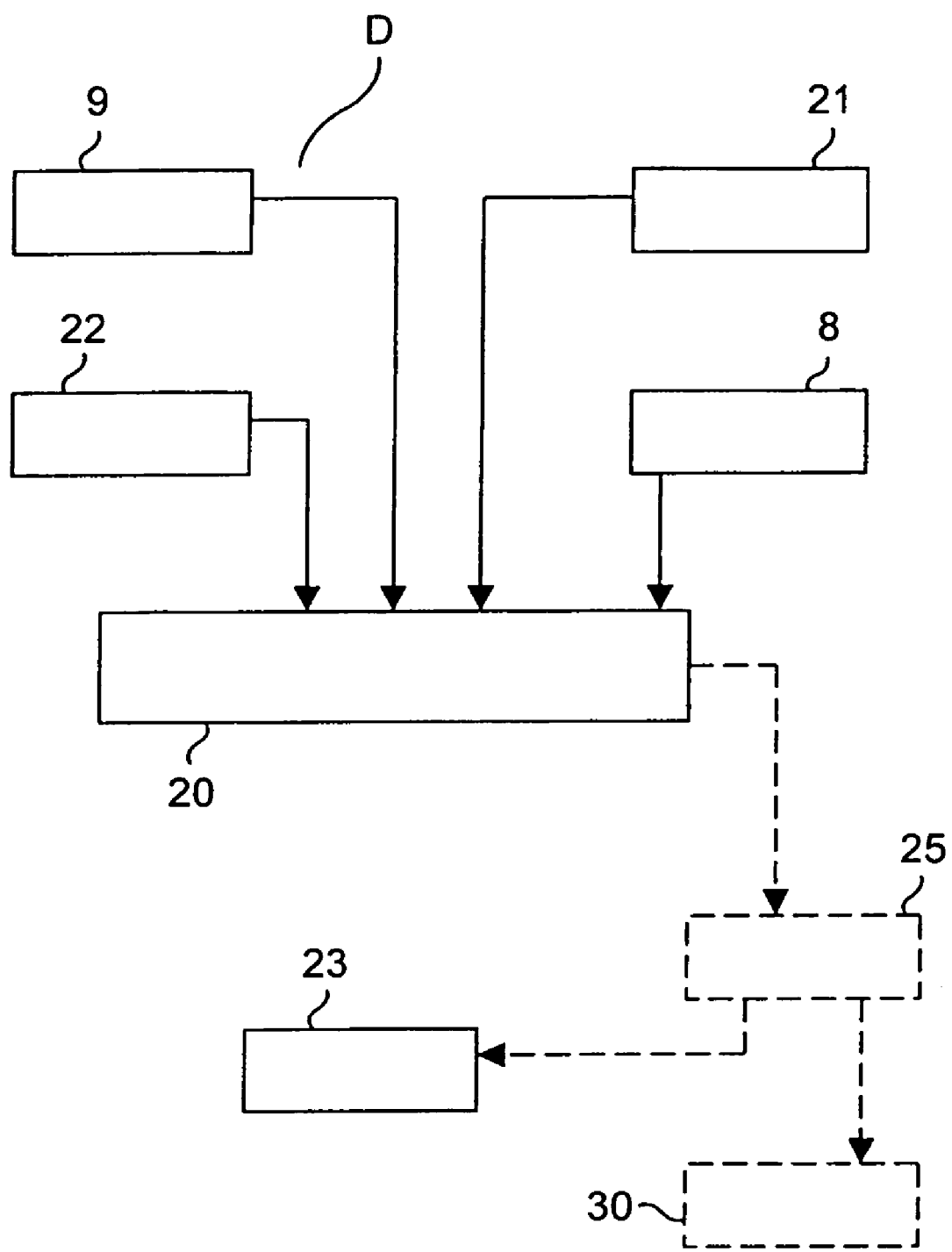
FIG. 8 is a block diagram of apparatus for tracking the least-noise flight path for a rotorcraft in operation.

The apparatus of the invention as shown diagrammatically in FIG. 8 serves to manage the flight of said rotorcraft 1 of the particular rotorcraft type so as to minimize the noise emitted during take-off and landing stages.

The apparatus D essentially comprises:

- a computer 20 having memory 21 containing the operating domains with pre-established wind DF for said reference rotorcraft, said computer 20 being capable of determining automatically the operating point F without wind and the operating domain with wind DF1 corresponding to the instantaneous equivalent mass ME of said rotorcraft 1;
- a vertical speed indicator (VSI) and air-speed and pressure gauge equipment 9 for acquiring values for flight path air-speed TA and vertical air-speed VZA of said rotorcraft 1;
- a receiver 22 for determining the ground speed and the position in three dimensions of said rotorcraft 1,
- display means 23 for displaying control set-points generated by said computer 20; and
- at least one fuel gauge 9 for determining the instantaneous mass of said rotorcraft 1.

Furthermore, the memory 21 may advantageously contain:

- the linear control law fFf' relative to wind situated in two angular sectors (S3, S4);
- the control law uFt with wind constituted by two straight half-lines Fu and Ft situated respectively in the angular sectors S3 and S4;
- the control law vFw in the presence of wind constituted by two curved portions vF and wF situated respectively in the angular sectors S3 and S4; and
- the control law vFw with wind constituted by a curve keeping equal distances from the domains in which noise is above the maximum acceptable noise BMA.

It should be observed that each of these control laws fFf', uFt, and vFw can be independent of the equivalent mass ME of the rotorcraft 1, and also from the operating domains DF and DF1.

Advantageously, said memory 21 contains an operating constraint which corresponds to a flight path of constant slope $\theta_{SH}$ for a rotorcraft 1 of a particular type of rotorcraft.

In a variant, said memory 21 contains an operating constraint which corresponds to the maximum climb performance function.

In another variant, said memory 21 contains an operating constraint which corresponds to a law representing the flight path air-speed TA as a function of time and which is applied in particular during horizontal overflight stages while accelerating or decelerating.

The receiver 22 may be a GPS receiver or any other equivalent device.

In the context of the present invention, said apparatus D for generating and tracking least-noise control set-points can keep the rotorcraft 1 on a flight path of substantially constant slope $\theta_{SH}$ relative to ground regardless of the mass of said rotorcraft and regardless of surrounding conditions (wind, ...). Under such conditions, the stage P3 can also be referred to as a "stabilized stage", or a stage of "stabilized operation", or indeed a "stabilized climb and descent stage".

Advantageously, the apparatus of the invention also makes it possible to maintain maximum climb performance or maximum accelerated or decelerated level overflight performance while minimizing the noise emitted by a rotorcraft 1 of the particular type of rotorcraft.

To this end, managing a least-noise procedure in accordance with the invention comprises three steps, with these three steps following one another repetitively at a rate matching the input parameters.

The first step concerns positioning the least-noise flight path, e.g. when landing, in the absence of wind at the landing site.

The pre-established flight path as shown in FIG. 2 and stored in the memory 21 has two variable elements:

- the length of the slope (zone P3) which depends on the height of level flight; and
- the length of the decelerating level flight (zone P1) which depends on the least-noise prior optimum overflight speed and on environmental constraints.

The computer 20 thus has an initial function of adapting the values of those two parameters to the current situation on the basis of data provided by the various means shown in FIG. 8, i.e., in particular:

- at least one fuel gauge 9 for determining the instantaneous mass of said rotorcraft 1; and
- a receiver 22 for determining the speed of said rotorcraft relative to the ground and for determining its position in three dimensions.

In order to compensate for the influence of wind, the computer 20, in a second step, generates continuous corrections for flight path air-speed TA and vertical air-speed VZA as are required to maintain the slope in the zone P3 substantially constant or indeed to comply with maximum flying performance or maximum accelerated or decelerated level overflight performance. These corrections are performed on the basis of the speed relative to the ground as indicated by the system 22 and the flight path air-speed TA as supplied by the VSI and the air-speed and pressure equipment 8.

At the end of this second step, the computer thus provides the control parameters that correspond to the flight path as corrected as a function of the wind.

In order to enable the flight point as calculated in this way to be achieved effectively, the computer 20, in a third step, must at each instant deliver control set-points to the pilot or to an autopilot 25 with these set-points being displayed on a display screen 23 so as to enable the pilot to take over in the event of the autopilot failing.

When an autopilot 25 is used, the control signals are applied to the flight control 30 in order to actuate the control surfaces of said rotorcraft 1.

Thus, the invention makes it possible for the noise measurements advantageously performed on said rotorcraft 1 to be more or less independent of wind. In addition, these measurements are taken only once prior to putting each particular type of rotorcraft into operational service.

Depending on the flight paths as pre-established in accurate and realistic manner, and taking account of the parameters that have the greatest influence, and applying flight path corrections as a function of measured wind, noise nuisance is minimized without any need for specific installations on the ground.

Naturally, the apparatus of the invention can be fitted to any type of rotorcraft, for example helicopters, combined fixed-wing and rotary-wing aircraft, and convertible aircraft.

Naturally, the present invention is capable of numerous variations as to its implementation. Although several embodiments are described, it will be understood that it is not conceivable to identify exhaustively all conceivable embodiments. Naturally any means described may be replaced by equivalent means without thereby going beyond the ambit of the present invention.

The invention claimed is:

1. A method of minimizing the noise emitted during take-off and landing of a rotorcraft (1) of a particular type of rotorcraft, the method being characterized in that in a preliminary flight period, in which a reference rotorcraft corresponding to a rotorcraft (1) of said particular type is used, the following steps are performed:

a) taking a series of measurements on the reference rotorcraft, to obtain during preliminary flights, values for a plurality of noise levels detected by a plurality p of sensors C secured to the reference rotorcraft and representative of noise emission for n configurations of the reference rotorcraft, determined by:

m masses M of said reference rotorcraft;

q speeds of rotation R1 for the main rotor (3); and r speeds of rotation R2 for the tail rotor (4);

b) from said series of measurements, establishing a first series of n×p diagrams D1 representing a series of equal noise levels L1 in a system of coordinates (TA, VZA), where TA is the flight path air-speed and VZA is the vertical air-speed of said reference rotorcraft;

c) transforming said first series of diagrams D1 into a second series of n×p diagrams D2 representing a series of equal noise levels L2 in the system of coordinates (TA, VZA) by:

firstly making a noise correction CV representative of noise nuisance depending on the duration of noise application; and secondly making a correction CMA to correcting each mass M into an apparent weight MA of the reference rotorcraft as a result of atmospheric conditions at flying altitude;

d) selecting in each diagram D2 the curve of equal noise levels L2P corresponding to a maximum acceptable noise BMA;

e) for each apparent weight MA, establishing the envelope of the curves L2P in the system of coordinates (TA, VZA) so as to determine m flight domains DV for which noise is less than said maximum acceptable noise BMA; and f) selecting in each flight domain DV, an operating domain DF which determines a set of m operating domains of the reference rotorcraft.

2. A method according to claim 1, characterized in that the correction CMA consists in calculating an apparent weight MA equal to $M/(\rho/\rho_0)$ where $\rho/\rho_0$ expresses the mass per unit volume relative to air at the altitude of flight.

3. A method according to claim 1, characterized in that the speed correction CV corresponds to a noise penalty in the form $10 \log(V/TA)$, where V designates a reference speed of said rotorcraft (1).

4. A method according to claim 3, characterized in that said reference speed V is the least-noise level overflight speed VS of the rotorcraft (1).

5. A method according to claim 3, characterized in that said reference speed V is the maximum climb speed VY of the rotorcraft (1).

6. A method according to claim 1, characterized in that for each subsequent period relating to take-off and landing of a rotorcraft (1) of a particular type of rotorcraft, the following steps are performed:

a) calculating the instantaneous equivalent mass ME of the rotorcraft (1); and b) determining the operating point F without wind and the instantaneous operating domain with wind DF1 of the rotorcraft (1) for said instantaneous equivalent mass ME on the basis of the set of m operating domains of the reference rotorcraft.

7. A method according to claim 6, characterized in that said operating are determined domains DF and DF1 occupy two angular sectors (S3, S4), each of these angular sectors having the operating point F without wind as its vertex and presenting a safety margin MS respectively relative to two angular sectors (S1, S2) coming from the operating point F without wind.

8. A method according to claim 7, characterized in that the operating point F without wind is independent of the equivalent mass ME of the rotorcraft (1) of the particular type of rotorcraft.

9. A method according to claim 7, characterized in that the effective operating points with wind FEF are situated on two straight half-lines Fu, Ff and Ft, Ff'', each of the straight half-lines passing via the operating point F without wind and being contained in a respective one of the angular sectors S3 and S4, thereby determining a control law uFt, fFf' with wind.

10. A method according to claim 7, characterized in that the effective operating points with wind FEF are situated on a curve vFw passing through the operating point F without wind, the curve portions vF and wF being contained respectively in the sectors S3 and S4, thereby determining a control law vFw with wind.

11. A method according to claim 9, characterized in that the control law uFt, fFf' is independent of the equivalent mass ME of a rotorcraft (1) of the particular type of rotorcraft.

12. A method according to claim 10, characterized in that the control law vFw is independent of the equivalent mass ME of a rotorcraft (1) of the particular type of rotorcraft.

13. A method according to claim 6, characterized in that the effective operating points with wind FEF are situated on a control curve vFw with wind passing through the operating point F without wind, said curve vFw being equidistant from the domains in which noise is greater than the maximum acceptable noise BMA.

14. A method according to claim 13, characterized in that the control law vFw is independent of the equivalent mass ME of a rotorcraft (1) of the particular type of rotorcraft.

15. A method according to claim 9, characterized in that an operating constraint is determined corresponding to a flight path of constant slope $\theta_{SH}$ for a rotorcraft (1) of the particular type of rotorcraft.

16. A method according to claim 9, characterized in that an operating constraint is determined corresponding to the maximum climb performance function.

17. A method according to claim 9, characterized in that an operating constraint is determined corresponding to a relationship representing the flight path air-speed TA as a function of time.

18. A method according to claim 1, characterized in that said plurality of noise levels includes at least the following noise levels whose values are measured by sensors (C) disposed:

a) on the side of the fuselage (2) of the reference rotorcraft corresponding to the blade advance side:

in a first zone N1 at the front of the fuselage (2);

in a second zone N2, slightly ahead of the main rotor (3) of said rotorcraft (1); and in a third zone N3 behind said main rotor (3); and b) at each of the ends of horizontal tail plane (12) of said reference rotorcraft.

19. A method according to claim 1, characterized in that said plurality of noise levels includes at least the following noise levels whose values are measured by sensors (C) disposed:

a) on the side of the fuselage (2) of the reference rotorcraft corresponding to the blade advance side:
in a first zone N1 at the front of the fuselage (2);
in a second zone N2, slightly ahead of the main rotor (3) of said rotorcraft (1); and
in a third zone N3 behind said main rotor (3); and b) on a pole situated in the plane of the tail rotor (4).

20. A method according to claim 1, characterized in that the plurality of noise levels includes noise levels whose values are measured by sensors (C) disposed in several zones N1, N2, N3 on the side of the fuselage (2), and further includes noise levels measured in zones M1, M2, and M3 that are respectively symmetrical to the zones N1, N2, and N3 about the longitudinal plane of symmetry of said reference rotorcraft.

21. A method according to claim 1, characterized in that the plurality of noise levels includes noise levels whose values are measured by sensors (C) disposed in several zones that are situated outside said fuselage (2) of said reference rotorcraft.

22. A method according to claim 1, characterized in that the plurality of noise levels includes noise levels whose values are measured by sensors (C) disposed in several zones that are situated inside said fuselage (2) of said reference rotorcraft.

23. A method according to claim 1, characterized in that said number n of configurations of said reference rotorcraft comprises:

at least one mass M corresponding to m=1; and
at least one speed of rotation R1 of the main rotor (3) corresponding to q=1.

24. A method according to claim 1, characterized in that said number n of configurations of said reference rotorcraft comprises:

three masses M corresponding to m=3; and
three speeds of rotation R1 of the main rotor (3) corresponding to q=3.

25. A method according to of claim 1, characterized in that said number n of configurations of said reference rotorcraft comprises:

three masses M corresponding to m=3;
three speeds of rotation R1 of the main rotor (3) corresponding to q=3; and
three speeds of rotation R2 of the tail rotor (4) corresponding to r=3.

26. A method according to claim 1, characterized in that said maximum noise level BMA corresponds to the minimum noise level in level flight at nominal speed of said rotorcraft (1).

27. A method according to of claim 1, characterized in that said sensors (C) are microphones.

28. A method according to claim 1, characterized in that it is implemented for a rotorcraft (1) selected from the group consisting of: a helicopter, a rotorcraft combining a rotary-wing and a fixed-wing, a convertible rotorcraft.

* * * * *